(12) United States Patent
Gershony

(10) Patent No.: US 6,456,396 B1
(45) Date of Patent: Sep. 24, 2002

(54) METHOD AND APPARATUS FOR GENERATING A SCREENED REPRODUCTION OF AN IMAGE

(75) Inventor: Moshe Abraham Gershony, Kfar Sava (IL)

(73) Assignee: Creoscitex Corporation Ltd., Herzliya (IL)

(*) Notice: Subject to any disclaimer, the term of this patent is extended or adjusted under 35 U.S.C. 154(b) by 0 days.

(21) Appl. No.: 09/229,501

(22) Filed: Jan. 11, 1999

(30) Foreign Application Priority Data

Jan. 12, 1998 (IL) .................................. 122902

(51) Int. Cl.⁷ .............................................. H04N 1/405
(52) U.S. Cl. ........................................ 358/3.11; 358/1.9
(58) Field of Search ........................... 358/1.9, 298–299, 358/456–460, 534–536, 3.02, 3.11, 3.12

(56) References Cited

U.S. PATENT DOCUMENTS

| | | | |
|---|---|---|---|
| 4,149,183 A | 4/1979 | Pellar et al. | 358/75 |
| 4,196,451 A * | 4/1980 | Pellar | 358/283 |
| 4,419,690 A | 12/1983 | Hammes | 358/75 |
| 4,456,924 A | 6/1984 | Rosenfeld | 358/75 |
| 5,079,721 A | 1/1992 | Gershony | 395/132 |
| 6,081,345 A * | 6/2000 | Curry | 358/1.9 |

FOREIGN PATENT DOCUMENTS

EP          0 651 560          5/1995

* cited by examiner

Primary Examiner—Thomas D. Lee
Assistant Examiner—Stephen Brinich
(74) Attorney, Agent, or Firm—Eitan, Pearl, Latzer & Cohen-Zedek

(57) ABSTRACT

A method for generating a screened reproduction of an image includes the steps of providing a representation of an original, defining a desired screen dot arrangement for the image, and writing screen dots in a line by line fashion. The representation of an original has input density values representing the grey levels of various locations of the original for a given color separation. Each screen dot is made up of a plurality of line segments whose length and location determines the dot configuration and whose length and location is determined by employing the input density values of the original and the desired screen dot arrangement. The method is characterized in that at least some of the plurality of line segments are shifted from an otherwise generally straight line configuration so as to cause them to conform to a desired overall dot shape.

22 Claims, 11 Drawing Sheets

METHOD AND APPARATUS FOR GENERATING A SCREENED REPRODUCTION OF AN IMAGE

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide an on/off control input for a laser plotter.

U.S. Pat. No. 4,149,183 describes an electronic halftone generator wherein a halftone signal is generated by pulse width modulating or comparing the scanned or video signal with a periodic analog signal having two frequencies and phases to create a dot pattern output which is a function of the frequency and phase of the two combined modulating signals. The halftone reproduction generated has variable dot configurations that are controllable to enable both rotation of the dot pattern and geometric modifications of the dot pattern.

U.S. Pat. No. 5,079,721 of the present applicant and assignee describes apparatus for generating a screened reproduction of an image which has met with significant commercial success.

SUMMARY OF THE INVENTION

The present invention relates to an improved method for generating a screened reproduction of an image.

There is provided in accordance with a preferred embodiment of the present invention a method for generating a screened reproduction of an image comprising the steps of:

providing a representation of an original having input density values representing the grey levels of various locations of the original for a given color separation;

defining a desired screen dot arrangement for the image; and writing screen dots in a line by line fashion, wherein each screen dot is made up of a plurality of line segments whose length and location determines the dot configuration and whose length and location is determined by employing the input density values of the original and the desired screen dot arrangement, the method being characterized in that at least some of the plurality of line segments are shifted from an otherwise generally straight line configuration so as to cause them to conform to a desired overall dot shape.

Preferably, at least some of the line segments include shifts so as to include a plurality of mutually offset generally straight line portions.

Further, at least some of the line segments include shifts so as to include at least one curved line portion.

In accordance with a preferred embodiment of the present invention, at least some of the line segments include shifts at a location interior of the dot and spaced from edges of the dot.

Preferably, an amount of offset produced by shifting of the line segments is less than an amount that the shifting location is spaced from the edges of the dot.

In accordance with a preferred embodiment of the present invention some of the plurality of line segments include shifts which produce a greater offset than the offset produced by shifting of others of the plurality of line segments.

There is also provided in accordance with a preferred embodiment of the present invention apparatus for generating a screened reproduction of an image comprising:

a grey level representation generator, providing a representation of an original having input density values representing the grey levels of various locations of the original for a given color separation;

a screen dot arranger, defining a desired screen dot arrangement for the image; and a marker, writing screen dots in a line by line fashion, wherein each screen dot is made up of a plurality of line segments whose length and location determines the dot configuration and whose length and location is determined by employing the input density values of the original and the desired screen dot arrangement, characterized in that:

at least some of the plurality of line segments include shifts from an otherwise generally straight line configuration so as to cause them to conform to a desired overall dot shape.

Preferably, the marker is operative such that at least some of the line segments include shifts so as to include a plurality of mutually offset generally straight line portions.

Even more preferably, at least some of the line segments include shifts so as to include at least one curved line portion.

In accordance with a preferred embodiment of the present invention, the marker is operative such that at least some of the line segments include shifts at a location interior of the dot and spaced from edges of the dot.

Preferably, the marker is operative such that an amount of offset produced by shifting of the line segments is less than an amount that the shifting location is spaced from the edges of the dot.

In accordance with a preferred embodiment of the present invention, the marker is operative such that some of the plurality of line segments include shifts which produce a greater offset than the offset produced by shifting of others of the plurality of line segments.

The apparatus of the present invention may be an imagesetter or digital printing apparatus.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1A:
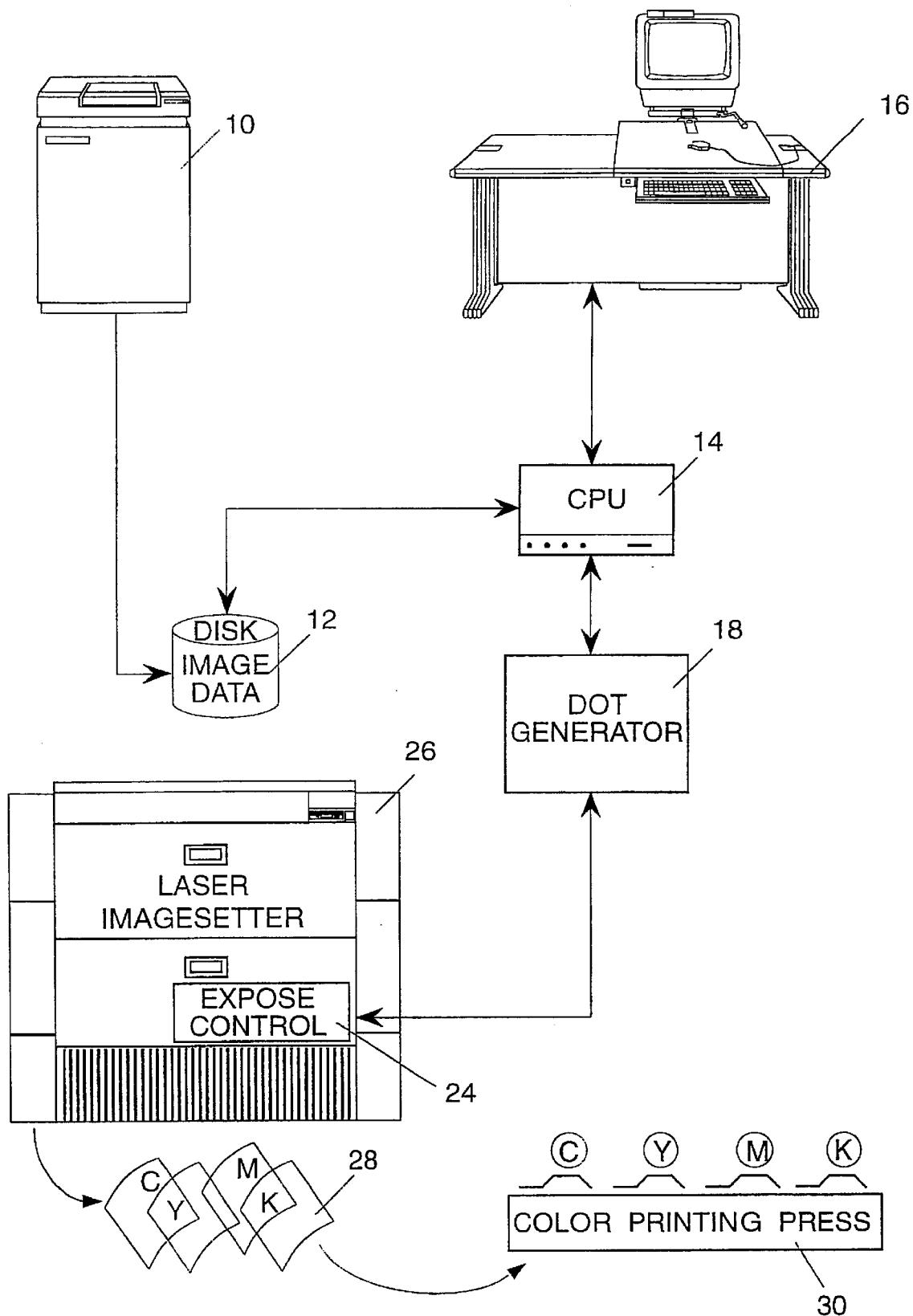
FIGS. 1A and 1B are simplified block diagram illustrations of a process color printing system and a digital printing system, respectively, constructed and operative in accordance with two preferred embodiments of the present invention.

Reference is now made to FIG. 1A which illustrates a system for generating a screened reproduction of an image, constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disc 12 or any other suitable storage medium, which is accessible by a CPU 14, such as an 80586. Interfacing with the CPU 14 are some interactive means 16 including typically a monitor, a keyboard and a mouse. The interactive means 16 are used by the operator to control the operation of the system of FIG. 1.

CPU 14 interfaces with screen dot generation circuitry 18, which in turn provides a control output to laser beam control circuitry 24 in a laser imagesetter 26, such as Dolev 800, commercially available by Scitex Corporation Ltd. of Herzlia, Israel. The term imagesetter refers throughout the specification and claims to an imagesetter which produces films or an imagesetter which produces plates, the latter also known as a plate setter.

Imagesetter 26 produces halftone film color separations 28 which are used to produce printing plates (not shown) employed in a conventional color printing press 30, to produce color prints on a printing substrate.

Figure 1B:
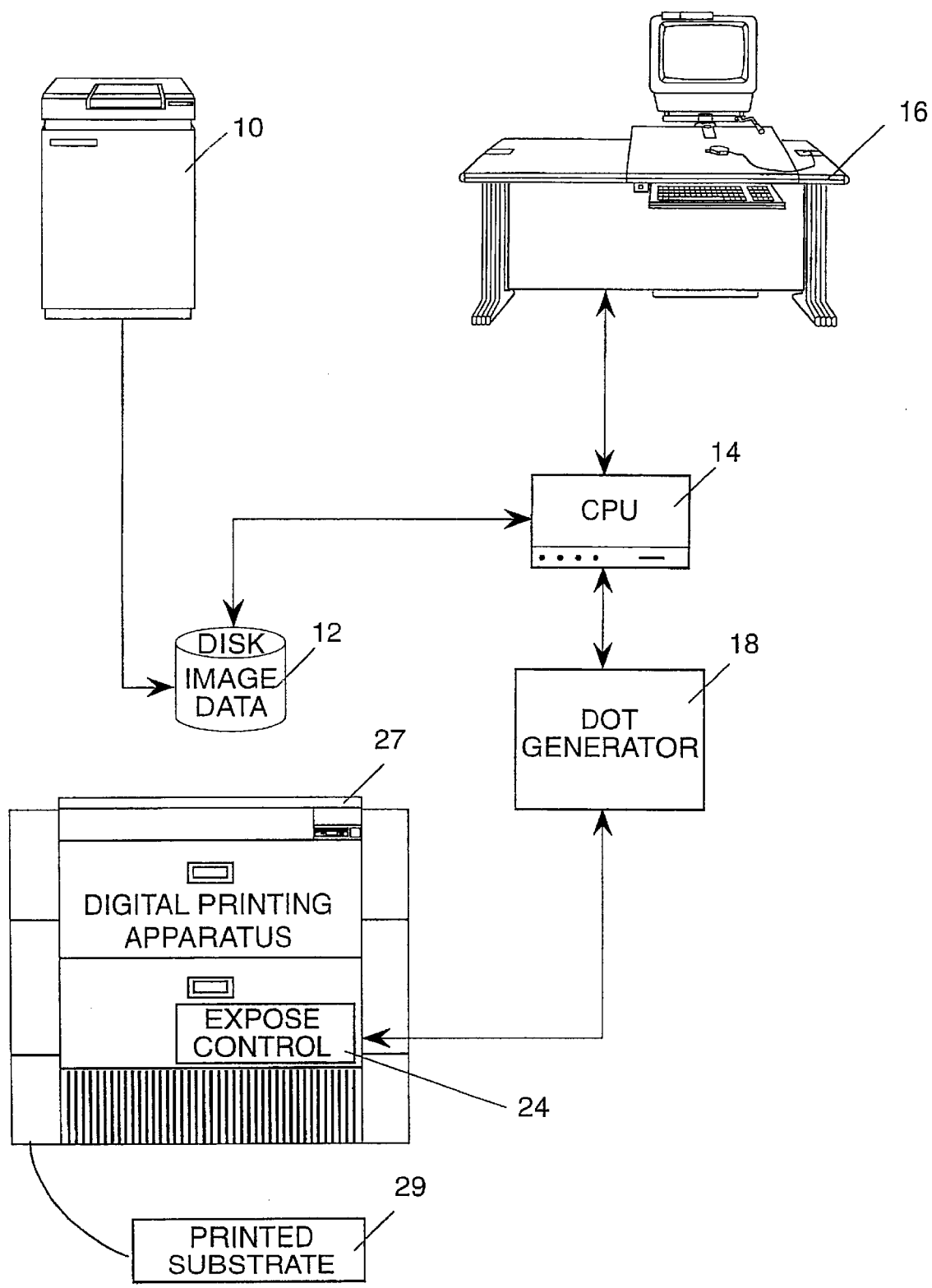

In the embodiment illustrated in FIG. 1B imagesetter 26, films 28, the conventional printing plates and color printing press 30 are replaced by a digital printing apparatus 27 which produces a printed substrate 29. Non limiting examples of digital printing apparatus 27 include electrophotographic printers, such as the E-Print 1000 commercially available from Indigo BV of Holland, or the Docucolor, commercially available from Xerox Inc. of USA and digital printing presses.

Figure 2:
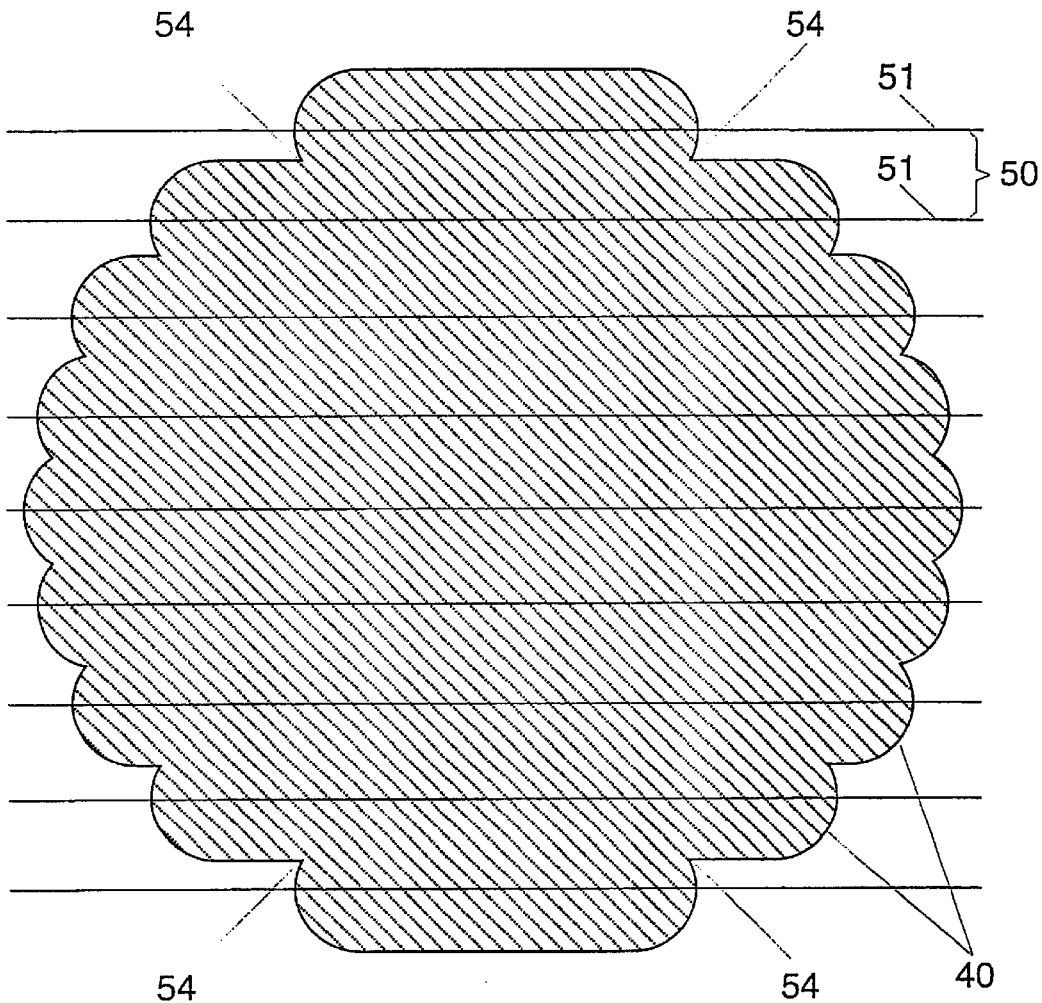
FIG. 2 is an illustration of a prior art line by line written screen dot produced in accordance with the teachings of applicant's U.S. Pat. No. 5,079,721.

Reference is now made to FIG. 2, which illustrates the construction of a prior art output screen dot produced by the imagesetter 26.

Imagesetter 26 defines a plurality of partially overlapping parallel line segments 40, having a spacing 50 between their respective center lines 51. The screen dot is a composite of such line segments 40. The construction of the dot of FIG. 2 is described in applicant's U.S. Pat. No. 5,079,721, the disclosure of which is hereby incorporated by reference.

It is a characteristic of the prior art that the spacing 50 is uniform and predetermined for an entire screen and thus does not vary over the dot or from dot to dot.

Figure 3:
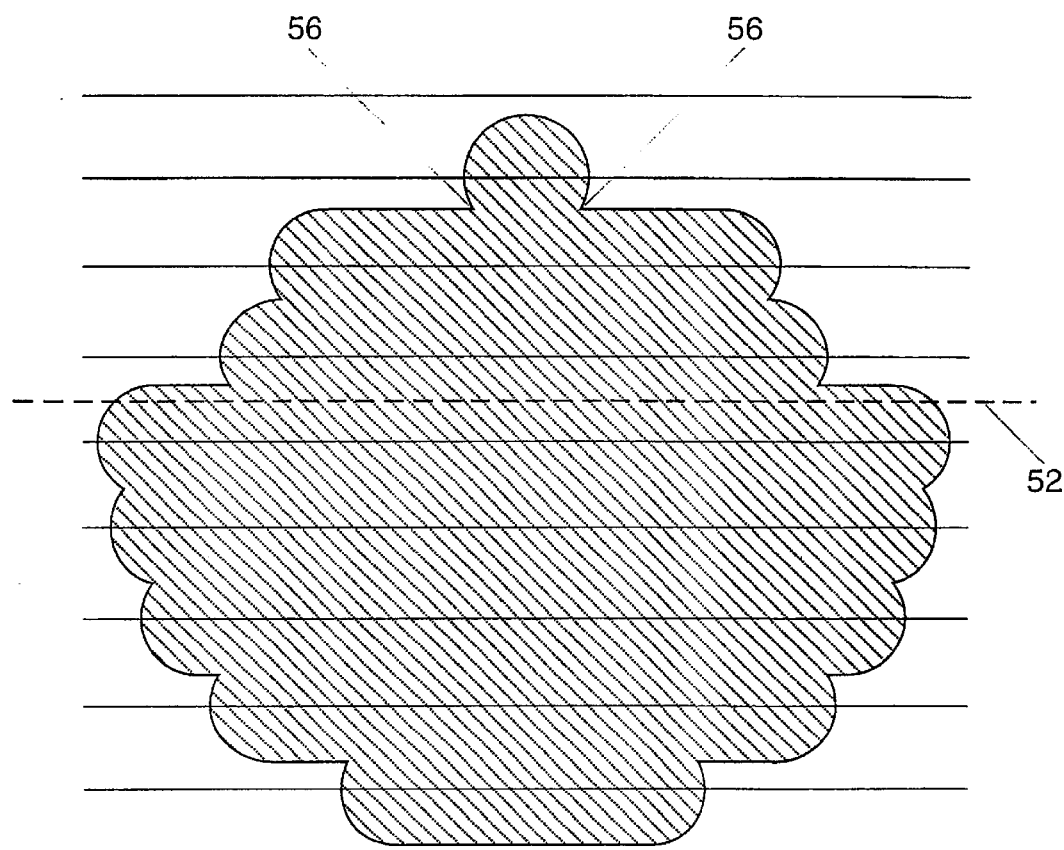
FIG. 3 is an illustration of another prior art line by line written screen dot produced in accordance with the teachings of applicant's U.S. Pat. No. 5,079,721.

The dot of FIG. 2 is a generally round dot having a single input density value throughout. Referring to FIG. 3, there is seen a prior art dot constructed in the same way as that of FIG. 2 but having two different input density values, the input density value above a line, indicated by reference numeral 52, being less than the input density value below line 52.

Here too, the spacing between the center lines of adjacent line segments is uniform and predetermined for an entire screen and thus does not vary over the dot or from dot to dot.

It is seen from a consideration of FIG. 2, that particularly adjacent the top and bottom of the dot, the dot departs significantly from roundness. The departure from roundness is particularly noticeable at regions indicated by reference numerals 54. This is even more problematic in certain cases, such as that seen at the top part of the dot of FIG. 3. Here the departure from roundness is even more acute, particularly at the locations, indicated by reference numerals 56.

Figure 4A:
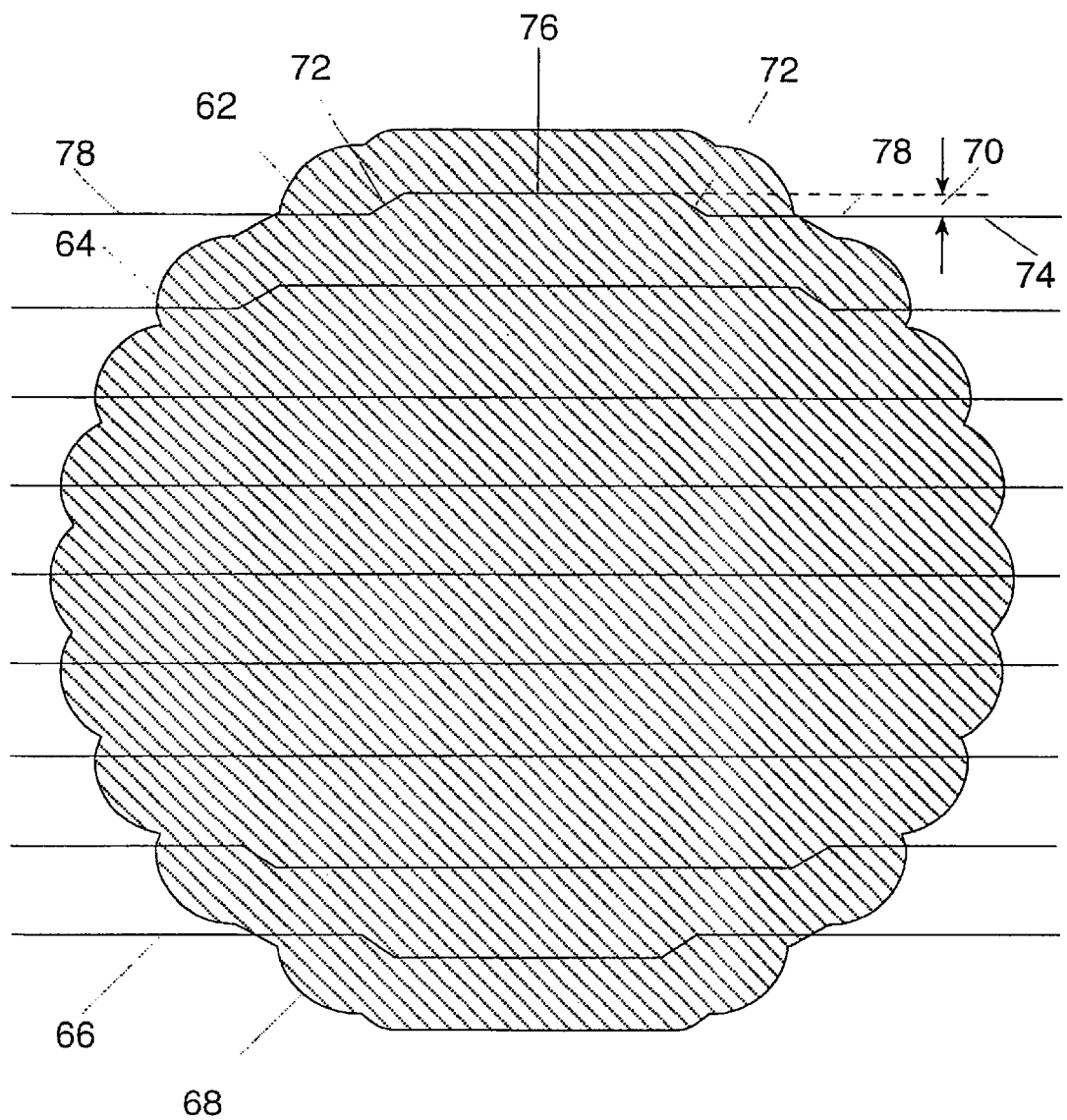
FIGS. 4A and 4B each illustrate a modified line by line written screen dot of the general type shown in FIG. 2, produced in accordance with a preferred embodiment of the present invention.
Figure 4B:
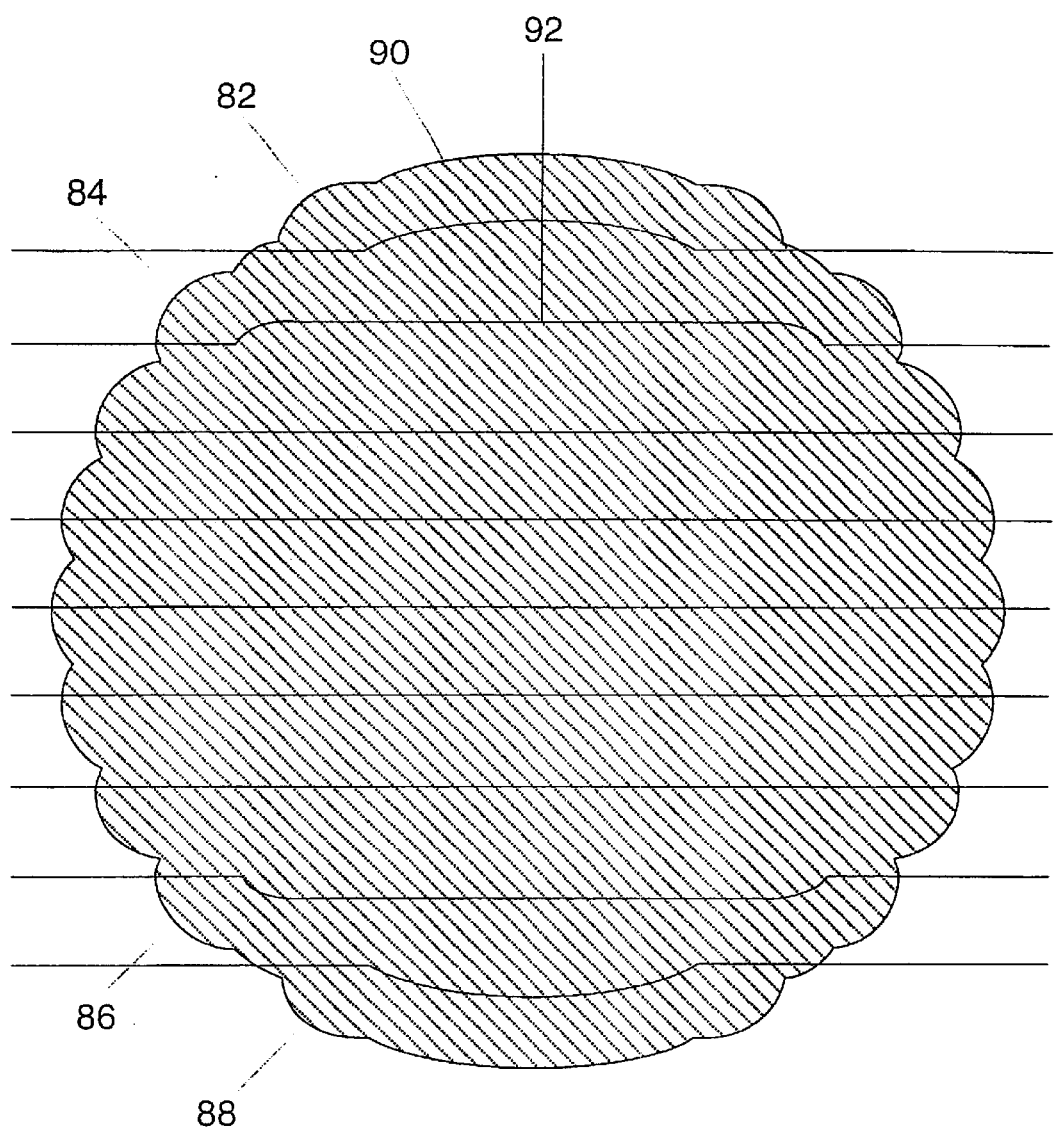

Reference is now made to FIGS. 4A and 4B which illustrate two alternative embodiments of an improved screen dot constructed and operative in accordance with a preferred embodiment of the present invention. Here, in contrast to the prior art represented by FIGS. 2 and 3, the spacing between the center lines of adjacent line segments and the overlap between adjacent line segments is varied.

Referring specifically to FIG. 4A, which illustrates a modification of the dot of FIG. 2, it is seen that the top two line segments and the bottom two line segments, here indicated respectively by reference numerals 62, 64, 66 and 68, each include shifts. Considering line segment 62, it is seen that it is shifted upwardly by an amount indicated by reference numeral 70 at locations 72, which are interior of the dot. As a result of the shifts, the center line of line segment 62, here indicated by reference numeral 74 is broken. Therefore it includes a central portion 76 which is vertically offset with respect to side portions 78.

The placement of locations 72 is selected to optimize roundness of the screen dot.

Line 64 similarly shifted, preferably at locations selected to optimize roundness of the screen dot. Similarly, and for the same reasons, downward shifts are provided in line segments 66 and 68. It is appreciated that a greater or smaller number of lines may have shifts.

The shifts in FIG. 4A are shown to be generally linear and are represented by inclined straight lines at locations 72. Reference is now made to FIG. 4B which, similarly to FIG. 4A, illustrates a screen dot which contains a plurality of line segments having non-linear shifts in their center line spacing.

In the screen dot of FIG. 4B, four line segments, indicated by reference numerals 82, 84, 86 and 88, include shifts. Line segment 82 includes a upwardly curved shifted portion 90. Line segment 84 includes a flattened upwardly curved shifted portion 92. Line segments 86 and 88 are similarly shifted in a downward sense. It is appreciated that the use of curved shifts, as shown in FIG. 4B provides a greater propinquity to roundness than does the use of only linear shifts, as in the embodiment of FIG. 4A.

Figure 5A:
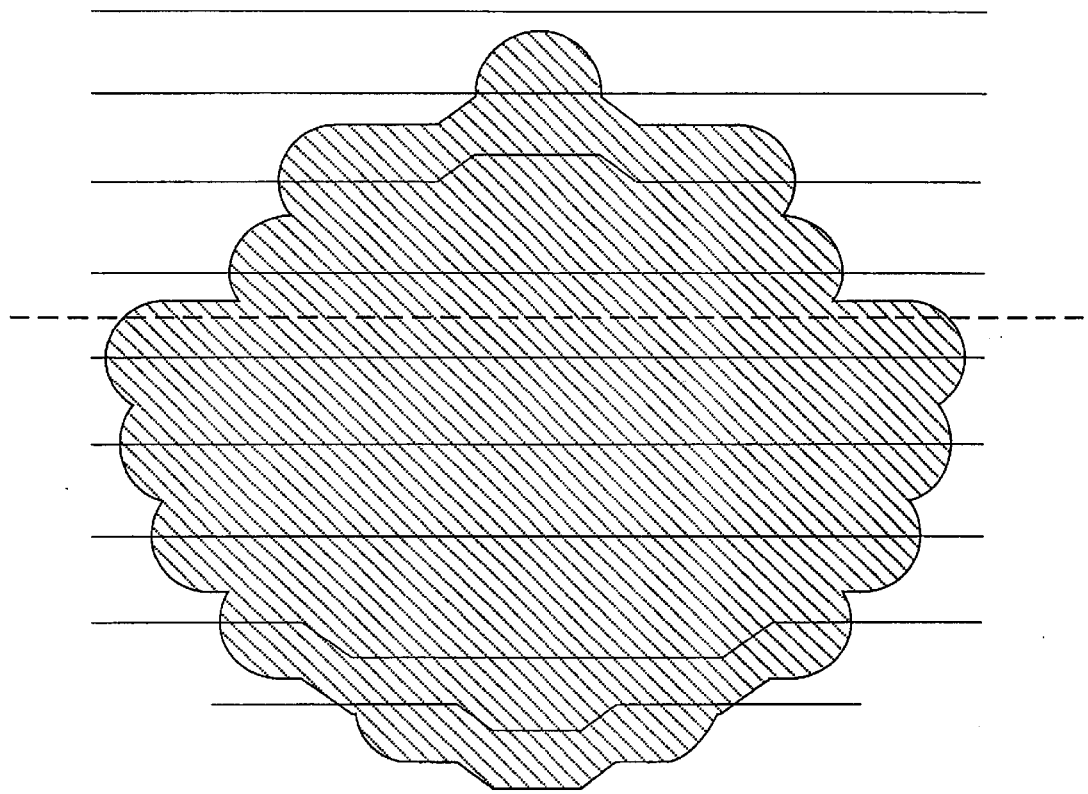
FIGS. 5A and 5B each illustrate a modified line by line written screen dot of the general type shown in FIG. 3, produced in accordance with a preferred embodiment of the present invention.
Figure 5B:
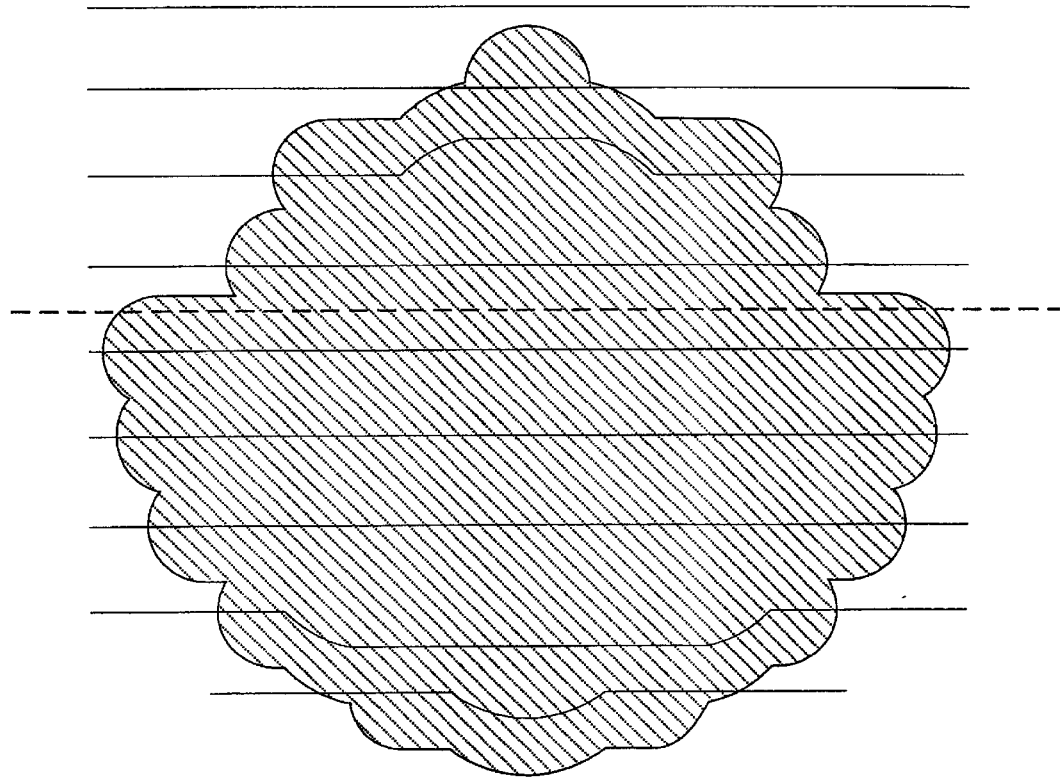

FIG. 5A illustrates an improvement of the dot of FIG. 3 by implementing linear type shifts, as in FIG. 4A. FIG. 5B illustrates an improvement of the dot of FIG. 3 by implementing non-linear type shifts, as in FIG. 4B.

Figure 6:
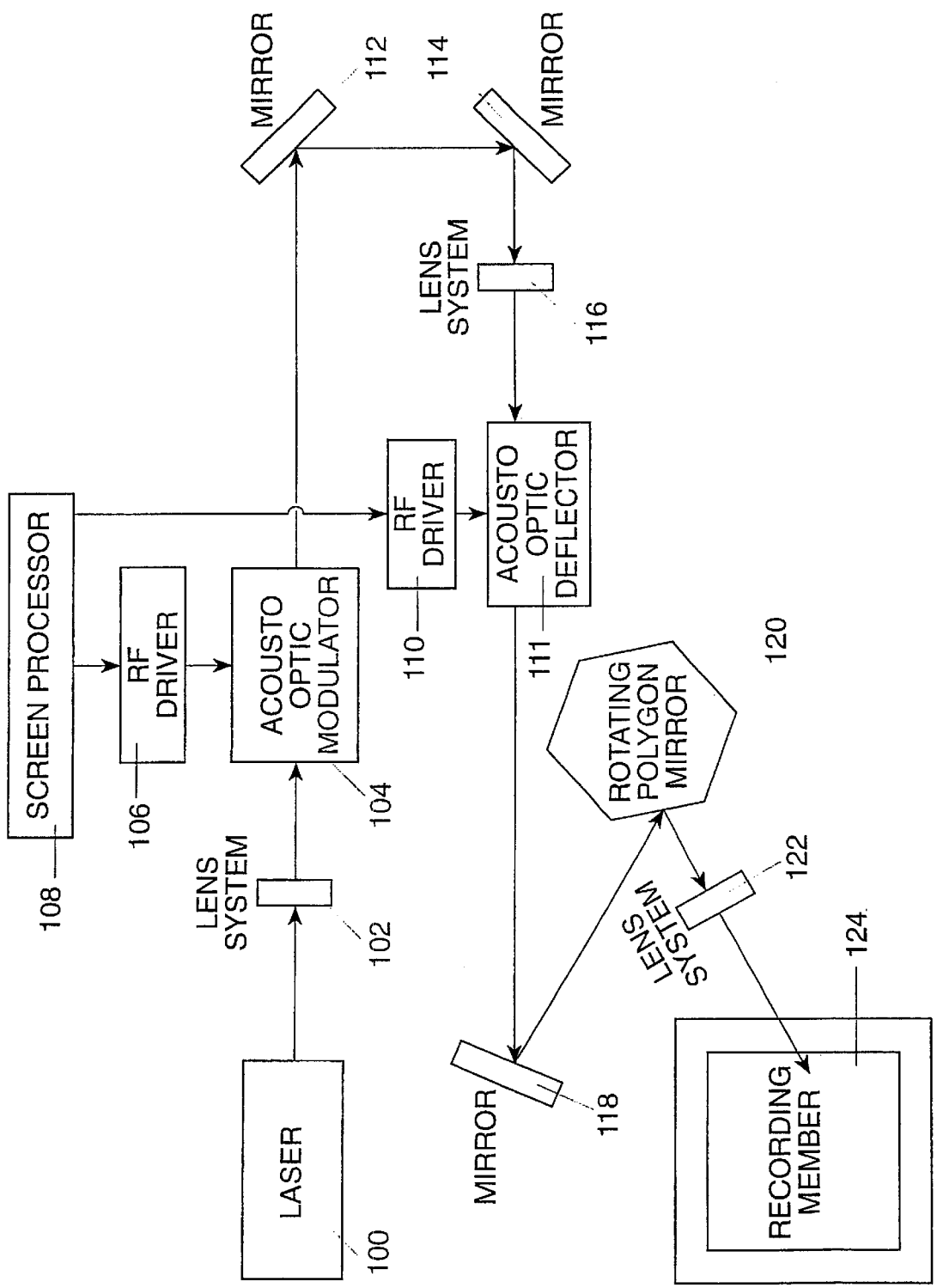
FIG. 6 is a simplified illustration of an electro-optical subsystem of a flat bed or capstan imagesetter or a digital printing apparatus modified in accordance with a preferred embodiment of the invention so as to produce an improved screen dot of the type shown, for example, in any of FIGS. 4A–5B.

Reference is now made to FIG. 6, which is a simplified illustration of an electro-optical subsystem of a flat bed or capstan imagesetter or digital printing apparatus modified in accordance with a preferred embodiment of the invention so as to produce an improved screen dot of the type shown, for example, in any of FIGS. 4A–5B.

The subsystem of FIG. 6 comprises a laser 100, such as a HeNe or diode laser, which transmits an output beam via a conventional lens system 102 to an acousto-optic modulator 104. The acousto-optic modulator 104 is driven by a conventional RF driver 106, receiving control inputs from a screen processor 108, which forms part of a dot generator 18 (FIGS. 1A and 1B).

The acousto-optic modulator 104 is operative for determining the start and stop of each line segment.

Downstream of acousto-optic modulator 104, the modulated laser beam is reflected by folding mirrors 112 and 114. Downstream of mirrors 112 and 114, the modulated laser beam passes through a conventional lens system 116. Screen Processor 108 also drives a RF driver 110 which in turn drives a conventional acousto optic deflector 111 which produces the desired shifts in the line segments as described hereinabove with reference to FIGS. 4A–5B. The shifted and modulated laser beam is thereafter reflected by a further mirror 118 to a rotating polygon mirror 120. The shifted and modulated laser beam reflected from rotating polygon mirror 120 is focused by a lens system 122 onto recording member 124.

The recording member 124 may be a film, a printing plate or the digital printing apparatus recording member which in the case of electrophotographic printer is a photo conductive material. The recording member 124 may lie on a flat bed, a capstan or a drum type arrangement.

Figure 7:
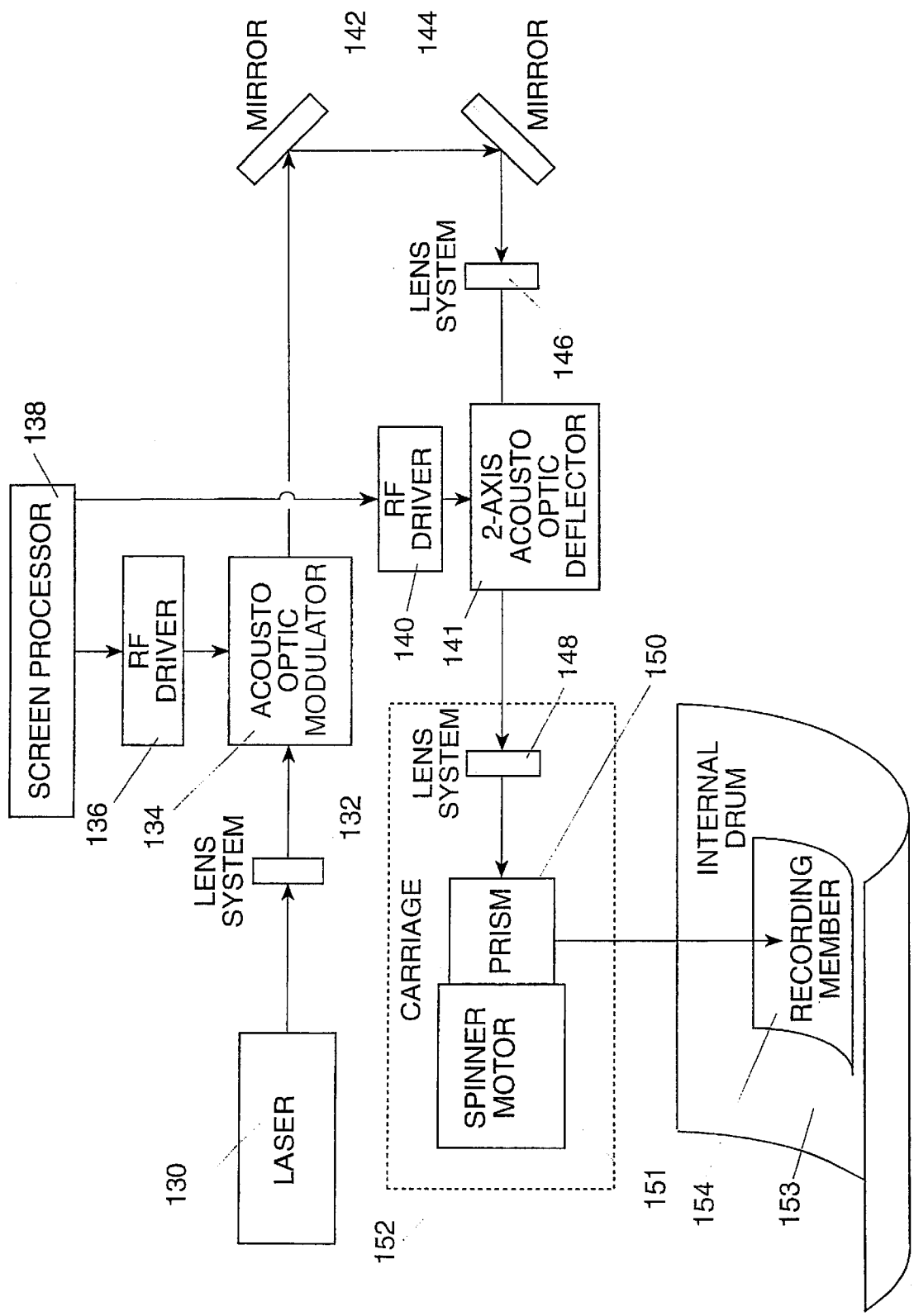
FIG. 7 is a simplified illustration of an electro-optical subsystem of an internal drum imagesetter or a digital printing apparatus modified in accordance with a preferred embodiment of the invention so as to produce an improved screen dot of the type shown, for example, in any of FIGS. 4A–5B.

Reference is now made to FIG. 7, which is a simplified illustration of an electro-optical subsystem of an internal drum imagesetter or digital printing apparatus modified in accordance with a preferred embodiment of the invention so as to produce an improved screen dot of the type shown, for example, in any of FIGS. 4A–5B.

The subsystem of FIG. 7 typically comprises a laser 130, such as a HeNe or diode laser, which transmits an output beam via a conventional lens system 132 to an acousto-optic modulator system 134. The acousto-optic modulator system 134 is driven by a conventional RF driver system 136, receiving control inputs from a screen processor 138, which forms part of a dot generator 18 (FIGS. 1A and 1B).

The acousto-optic modulator system 134 is operative for determining the start and stop of each line segment.

Downstream of acousto-optic modulator 134, the modulated laser beam is reflected by folding mirrors 142 and 144. Downstream of mirrors 142 and 144, the modulated laser beam passes through a conventional lens system 146. Screen Processor 138 also drives a RF driver 140 which in turn drives a 2 axis acousto optic deflector 141 which produces the desired shifts in the line segments as described hereinabove with reference to FIGS. 4A–5B.

Downstream 2 axis acousto optic deflector 141 the modulated and shifted beam passes through a further conventional lens system 148 and impinges on a rotating prism 150. Lens system 148 and rotating prism 150 together with a spinner motor 151, driving the rotating prism, are all mounted on a linear movable carriage 152 located inside a drum 153. The modulated and shifted laser beam is reflected by the prism 150 onto recording member 154 which lies on an inside cylindrical surface of drum 153. The recording member 154 may be any of the recording members described with reference to FIG. 6 hereinabove.

Figure 8:
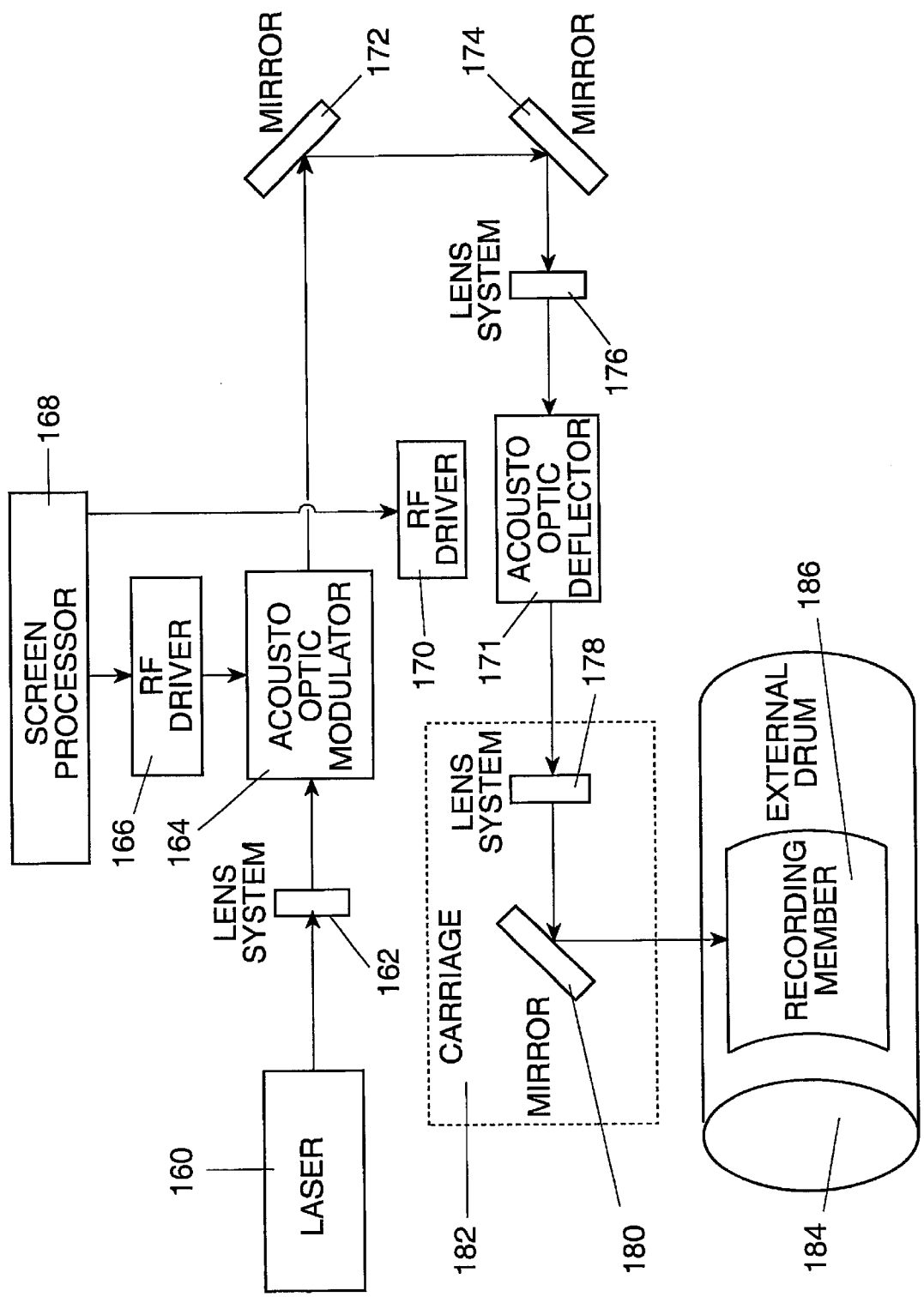
FIG. 8 is a simplified illustration of an electro-optical subsystem of an external drum imagesetter or a digital printing apparatus modified in accordance with a preferred embodiment of the invention so as to produce an improved screen dot of the type shown, for example, in any of FIGS. 4A–5B.

Reference is now made to FIG. 8, which is a simplified illustration of an electro-optical subsystem of an external drum imagesetter or digital printing apparatus modified in accordance with a preferred embodiment of the invention so as to produce an improved screen dot of the type shown, for example, in any of FIGS. 4A–5B.

The subsystem of FIG. 8 typically comprises a laser 160, such as a HeNe or diode laser, which transmits an output beam via a conventional lens system 162 to an acousto-optic modulator 164. The acousto-optic modulator 164 is driven by a conventional RF driver 166, receiving control inputs from a screen processor 168, which forms part of a dot generator 18 (FIGS. 1A and 1B).

The acousto-optic modulator 164 is operative for determining the start and stop of each line segment.

Downstream of acousto-optic modulator 164, the modulated laser beam is reflected by folding mirrors 172 and 174. Downstream of mirrors 172 and 174, the modulated laser beam passes through a conventional lens systems 176. Screen processor 168 also drives a RF driver 170 which in turn drives a single axis acousto optic deflector 171 which produces the desired shifts in the line segments as described hereinabove with reference to FIGS. 4A–5B. Downstream single axis acousto optic deflector 171 the modulated and shifted beam passes through lens system 178 and impinges on a mirror 180. Lens system 178 and mirror 180 are all mounted on a linear movable carriage 182 located outside a drum 184. The modulated laser beam is reflected by the mirror 180 onto recording member 186 which lies on an outside cylindrical surface of drum 184.

Recording member 186 may be any of the recording members described with reference to FIG. 6 hereinabove.

It will be appreciated that while the invention has been described with respect to a limited number of embodiments, many variations and modifications all of which fall with the scope of the invention exist. For example, while the optical systems in FIGS. 7 and 8 were described with respect to a carriage including only one lens system and mirror, all of the optic elements including the laser modulating acousto optic modulator and the shifting acousto optic deflector and the intermediate optical elements may lie on the carriage. Another example is that the optical systems of FIG. 6 may also be located on a moving carriage.

It will be appreciated by persons skilled in the art that the present invention is not limited by what has been particularly shown and described hereinabove. Rather the scope of the present invention is defined only by the claims which follow.

What is claimed is:

1. A method of generating a screened reproduction of an image comprising the steps of:
   providing a representation of an original having input density values representing grey levels of various locations of the original for a given color separation;
   defining a desired screen dot arrangement for the image; and
   writing screen dots in a line by line fashion, wherein each screen dot is made up of generally straight line segments whose length and location determine the dot configuration and whose length and location are determined by employing the input density values of the original and the desired screen dot arrangement, the method being characterized in that portions of at least some of said line segments are shifted so that said line segments conform to a desired overall dot shape and create a configuration not consisting solely of straight lines.

2. A method according to claim 1, wherein said portions are shifted so as to create a plurality of mutually offset generally straight line portions.

3. A method according to claim 1, wherein said portions are shifted so as to create at least one curved line portion.

4. A method according to claim 1, wherein said portions are located at a shifting location interior of the dot and spaced from edges of the dot.

5. A method according to claim 2, wherein said portions are located at a shifting location interior of the dot and spaced from edges of the dot.

6. A method according to claim 3, wherein said portions are located at a shifting location interior of the dot and spaced from edges of the dot.

7. A method according to claim 4, wherein an amount of offset produced by shifting of said portions is less than an amount that the shifting location is spaced from edges of the dot.

8. A method according to claim 1, wherein some of said line segments include shifted portions which produce a greater offset than the offset produced by shifted portions in other line segments.

9. A method according to claim 2, wherein some of said line segments include shifted portions which produce a greater offset than the offset produced by shifted portions in other line segments.

10. A method according to claim 3, wherein some of said line segments include shifted portions which produce a greater offset than the offset produced by shifted portions in other line segments.

11. Apparatus for generating a screened reproduction of an image comprising:

a grey level representation generator, providing a representation of an original having input density values representing the grey levels of various locations of the original for a given color separation;

a screen dot arranger, defining a desired screen dot arrangement for the image; and a marker, writing screen dots in a line by line fashion, wherein each screen dot is made up of generally straight line segments whose length and location determine the dot configuration and whose length and location are determined by employing the input density values of the original and the desired screen dot arrangement, characterized in that:

portions of at least some of said line segments are shifted so that said line segments conform to a desired overall dot shape and create a configuration not consisting solely of straight lines.

12. Apparatus according to claim 11, wherein said marker is operative such that said portions are shifted so as to create a plurality of mutually offset generally straight line portions.

13. Apparatus according to claim 11, wherein said marker is operative such that said portions are shifted so as to create at least one curved line portion.

14. Apparatus according to claim 11, wherein said marker is operative such that said portions are located at a shifting location interior of the dot and spaced from edges of the dot.

15. Apparatus according to claim 12, wherein said marker is operative such that said portions are located at a shifting location interior of the dot and spaced from edges of the dot.

16. Apparatus according to claim 13, wherein said marker is operative such that said portions are located at a shifting location interior of the dot and spaced from edges of the dot.

17. Apparatus according to claim 14, wherein said marker is operative such that an amount of offset produced by shifting of said portions is less than an amount that the shifting location is spaced from the edges of the dot.

18. Apparatus according to claim 11, wherein said marker is operative such that some of said line segments -include shifted portions which produce a greater offset than the offset produced by shifted portions in other line segments.

19. Apparatus according to claim 12, wherein said marker is operative such that some of said line segments include shifted portions which produce a greater offset than the offset produced by shifted portions in other line segments.

20. Apparatus according to claim 13, wherein said marker is operative such that some of said line segments include shifted portions which produce a greater offset than the offset produced by shifted portions in other line segments.

21. Apparatus according to claim 11 wherein the apparatus is an imagesetter.

22. Apparatus according to claim 11 wherein the apparatus is a digital printing apparatus.

* * * * *